United States Patent
Canini et al.

(10) Patent No.: US 6,921,243 B2
(45) Date of Patent: Jul. 26, 2005

(54) DEVICE FOR PRODUCING ELECTRIC CURRENT FROM WIND ENERGY

(75) Inventors: Jean-Marc Canini, Aibes (FR); Yves Milet, Solre le Chateau (FR); Patrick Brutsaert, Recquignies (FR)

(73) Assignee: Jeumont S.A., Courbevoie (FR)

( * ) Notice: Subject to any disclaimer, the term of this patent is extended or adjusted under 35 U.S.C. 154(b) by 0 days.

(21) Appl. No.: 10/311,686

(22) PCT Filed: Jun. 6, 2001

(86) PCT No.: PCT/FR01/01747
§ 371 (c)(1),
(2), (4) Date: Dec. 19, 2002

(87) PCT Pub. No.: WO01/98655
PCT Pub. Date: Dec. 27, 2001

(65) Prior Publication Data
US 2003/0194310 A1 Oct. 16, 2003

(30) Foreign Application Priority Data
Jun. 19, 2000 (FR) .......................................... 00 07813

(51) Int. Cl.⁷ .............................................. F03B 15/06
(52) U.S. Cl. ..................... 415/4.3; 415/4.2; 415/229; 415/908; 290/55; 290/44
(58) Field of Search ........................ 415/4.2, 4.3, 908, 415/229; 290/55, 44

(56) References Cited

U.S. PATENT DOCUMENTS

| | | |
|---|---|---|
| 5,208,522 A | 5/1993 | Griepentrog et al. |
| 5,269,652 A | 12/1993 | Petersen |
| 6,285,090 B1 * | 9/2001 | Brutsaert et al. .............. 290/55 |
| 6,452,287 B1 * | 9/2002 | Looker ......................... 290/55 |
| 6,465,901 B2 * | 10/2002 | Croes ........................... 290/55 |
| 6,504,260 B1 * | 1/2003 | Debleser ....................... 290/44 |

FOREIGN PATENT DOCUMENTS

| | | |
|---|---|---|
| DE | 4402184 A1 | 8/1995 |
| EP | 0864748 A1 | 9/1998 |
| FR | 2796671 | 1/2001 |
| GB | 2201200 A | 8/1988 |
| WO | WO 200159296 A1 * | 8/2001 ............. F03D/9/00 |

OTHER PUBLICATIONS

E. Hau: "Windkraftanlagen" 1996, Springer Verlag, Berlin, XP002160649, 241430, pp. 246–247, * Bild 8.29 unten* .

International Search Report, PCT/FR01/01747, Aug. 23, 2001, pp. 1–4.

* cited by examiner

*Primary Examiner*—Theresa Trieu
(74) *Attorney, Agent, or Firm*—Connolly Bove Lodge & Hutz LLP

(57) ABSTRACT

The system comprises a nacelle mounted to turn about a vertical axis on the top of a mast and carrying a rotary portion which rotates about a substantially horizontal axis in a large diameter bearing. The rotary portion comprises a hub to which blades are fixed. The system has an electric generator comprising a stator and a rotor in the shape of a disk. The rotor is fixed by a connecting member to the hub adjacent the bearing so that the forces exerted by the wind on the rotary portion are transmitted directly to the bearing without passing through the electric generator.

9 Claims, 1 Drawing Sheet

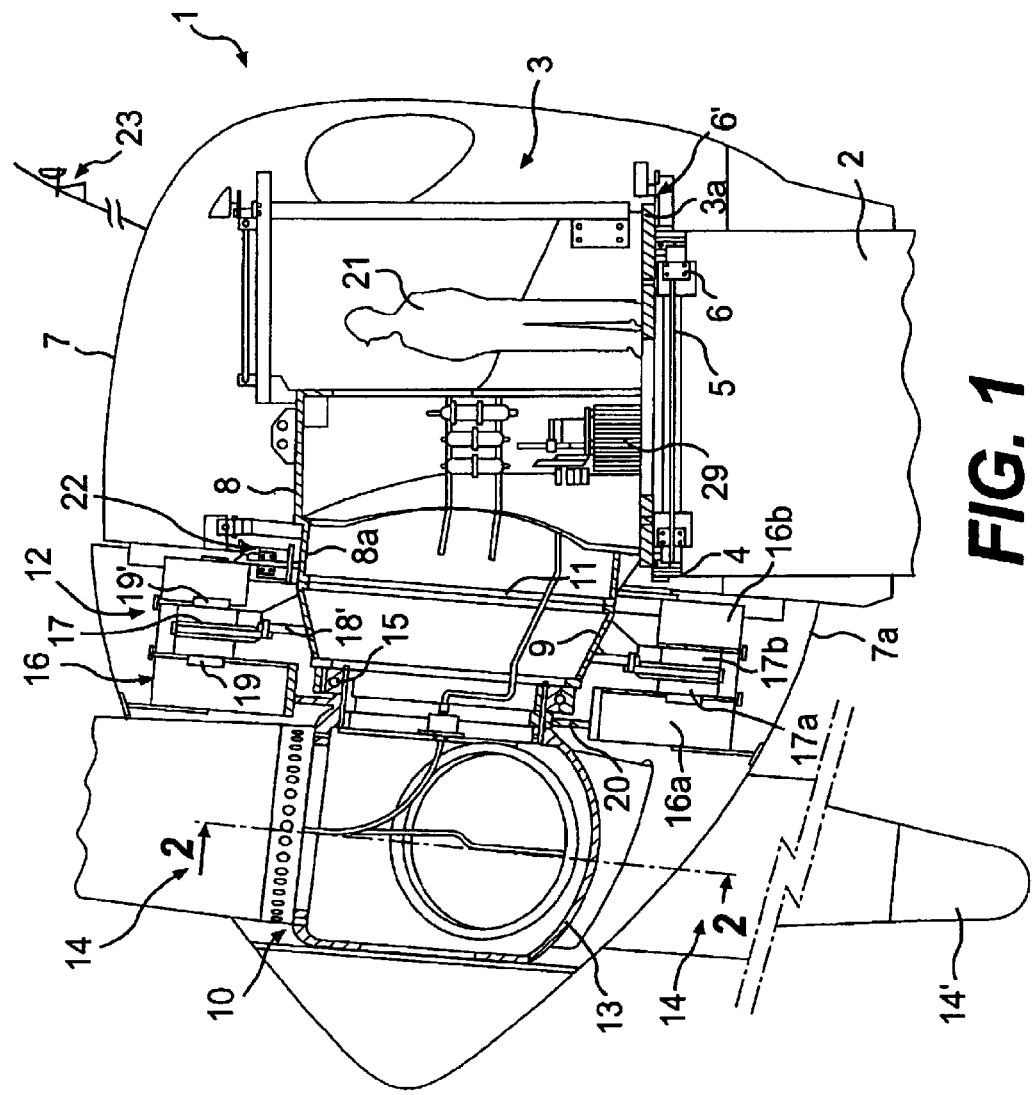
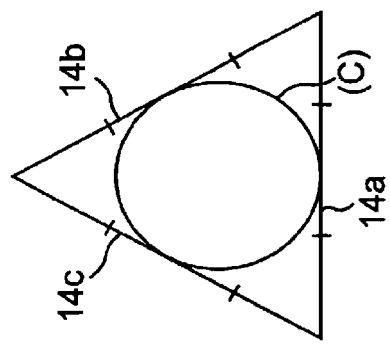

DEVICE FOR PRODUCING ELECTRIC CURRENT FROM WIND ENERGY

FIELD OF THE INVENTION

The invention relates to a system for producing electricity from wind energy.

BACKGROUND OF THE INVENTION

Systems for capturing energy from wind, known as wind energy systems, are known in the art and comprise a vertical mast with its bottom end fixed to the ground, the seabed or a floating platform and a nacelle mounted to turn about a vertical axis on a portion of the top end of the mast. The rotary portion of the system is mounted on the nacelle to rotate about an axis that is substantially horizontal or slightly inclined to the horizontal and comprises a hub and two or more blades fixed to the hub and extending radially therefrom relative to the rotation axis of the hub. The hub rotates on the nacelle in one or more bearings. Electricity is produced from wind energy captured by the rotary portion of the system by a generator such as an alternator which can include one or more stators secured to the nacelle and one or more rotors secured to the hub of the rotary portion of the system.

One problem encountered by manufacturers of wind energy systems is the need to obtain a high electrical power rating at the same time as limiting the size of the electricity generator, which impacts on the size of the nacelle. It is known in the art that disk generators, i.e. machines comprising one or more rotors and one or more stators with facing annular faces on which there are disposed magnetic or electromagnetic members that cooperate to produce electricity, can be advantageous because a relatively large active surface area of the machine can be obtained within a small volume. These systems are particularly advantageous if the rotor of the generator is fixed directly to the rotary portion of the system, thereby avoiding the need to use a mechanical speed multiplier.

However, this technique has not been routinely used on an industrial scale until now because it is difficult to design a rotary mounting for the rotary portion and the rotor such that it is possible block and/or balance forces, in particular axial forces, exerted on the rotary portion in order to maintain the position of the rotor or rotors relative to the stator disks.

The rotary portion of the wind energy system is subjected to forces exerted by the wind, which in particular cause flexing of the hub and its rotary support means, even if one or more thrust bearings are provided to compensate axial forces exerted on the rotary portion.

If the rotor of the generator is fixed to the rotary portion of the wind energy system, the forces exerted by the wind on the rotary portion are transmitted directly to the rotor of the generator, and it is then difficult in a disk machine having one or more rotor disks facing one or more stator disks to maintain the width of the airgaps of the generator at values that are small and precise.

Also, when the wind energy system is operating, the rotary portion of the system, and especially the rotor, is subjected to alternating forces and deformations that lead to fatigue failure of these components in service.

Also known in the art are systems for producing electricity from wind energy comprising a conventional radial flux alternator whose rotary portion rotates on the nacelle in a bearing such as a rolling bearing fixed to a tubular shaft secured to the nacelle and having an axis slightly inclined to the horizontal. The hub of the rotary portion of the system is secured to a tubular support which rotates on the outer race of the bearing and which carries the radial rotor of the electricity generator on a portion at its end opposite the hub carrying the blades. In this case the wind exerts a force via the blades and the hub that tends to cause the rotor to pivot relative to the bearing of the rotary portion about an axis perpendicular to the axis of the bearing.

The hub carrying the blades of the rotor, which are fixed cantilever-fashion relative to the bearing, exerts high levels of torque on the bearing and on the support structure of the wind energy system.

Because very high performance permanent magnets are now available off the shelf, producing disk electricity generators including a rotor carrying permanent magnets can now be envisaged, and disk machine rotors and stators can be made that limit the weight and the total length of the electricity generators.

It is therefore highly advantageous to be able to produce a wind energy system with a structure enabling a permanent magnet disk electricity generator to be used.

BRIEF DESCRIPTION OF THE INVENTION

The object of the invention is therefore to propose a system for producing electricity from wind energy, the system comprising a vertical mast having a bottom end portion fixed to a support surface, a nacelle which turns about a vertical axis on a top end portion of the mast, a rotary portion including a hub and two or more substantially radial blades fixed to the hub, a bearing in which the rotary portion of the nacelle rotates and which has a substantially horizontal axis, and an electricity generator comprising a stator secured to the nacelle and a rotor secured to the hub of the rotary portion by a fixing member substantially perpendicular to the rotation axis of the rotary portion, the system producing high installed power for a nacelle of small volume.

With the above object in view:
  both the rotor and the stator have respective active portions each in the form of a disk carrying facing electromagnetic members,
  the rotary portion rotates on the nacelle in a single bearing whose diameter is less than 20% less than the diameter of a circle inscribed in the cross section perpendicular to the axis of the rotary portion of a surface formed by areas in which the blades are connected to the hub, and
  the fixing member fixing the rotor to the hub is adjacent the bearing in the axial direction of the bearing.

To explain the invention, an embodiment of a system in accordance with the invention for producing electricity is described below by way of example and with reference to the accompanying drawing.

BRIEF DESCRIPTION OF THE FIGURES

FIG. 1 is an elevation view in section in a vertical plane of the upper portion of a wind energy system in accordance with the invention.

DETAILED DESCRIPTION OF THE INVENTION

FIG. 1 shows an upper portion of a wind energy system 1 in accordance with the invention.

FIG. 2 is a schematic sectional view taken along section 2—2 of FIG. 1.

The wind energy system 1 has a vertical mast 2, of which only the top end portion is shown in FIG. 1.

The mast 2, of which only the top portion is shown in FIG. 1, can be very tall, for example it can be of the order of 40 m to 50 m tall, and the lower portion of the mast is fixed to an anchor block on the ground at the wind energy production site, to the seabed, or to a floating platform in the case of an offshore installation.

On the top portion of the mast 2 shown in FIG. 1, there is mounted a nacelle 3 which includes a platform 3a that is mounted on the top portion of the mast 2 to turn in a rolling ring 4 and that is secured by tie-rods so that the nacelle 3 is able to turn about the vertical axis of the mast 2 and is supported by the top end portion of the mast 2. A disk brake 5 including calipers 6 distributed around the periphery of a ring secured to the platform 3a is used to brake the nacelle, which is turned about the vertical axis of the mast 2 by drive gear motors 6'.

The platform 3 has a streamlined enclosure 7 or fairing to protect the components of the wind energy system inside the nacelle.

The platform 3a of the nacelle supports in particular the main frame 8 of the nacelle, a hydraulic supply 29 for the brake 6 of the system for turning the nacelle about the vertical axis of the mast and a brake described later for slowing and stopping a rotary portion 10 of the nacelle, a system for cooling the electricity generator of the wind energy system, a cabinet containing the control electronics of the wind energy system, and a cabinet containing an electrical converter for processing the electricity produced by the generator and various accessories for adjusting the wind energy system while in operation.

The support frame 9 for the stator 17 of the electricity generator takes the form of a frustoconical tubular member and is fixed to the main frame 8 of the nacelle by a cylindrical connecting portion 8a. The cylindrical connecting portion 8a and the frame 9 of the stator portion of the generator are disposed with their axes aligned and slightly inclined to the horizontal and they are connected in a connecting plane 11 that is slightly inclined to the vertical.

The wind energy system has a rotary portion 10 which includes a hub 13 which can rotate about an axis which is slightly inclined to the horizontal and common to the frame 9 and to the connecting portion 8a in a single bearing 15, which is preferably a large rolling bearing.

The force of the wind on blades 14 of the rotary portion of the wind energy system, which are fixed to the hub 13, causes the rotary portion 10 of the system to rotate.

In the embodiment shown, the hub 13 has three annular plane areas for fixing respective blades 14a, 14b and 14c distributed around the axis of the hub at substantially 120° on three plane faces of the hub 13 constituting a prism-shaped surface whose cross section ma plane perpendicular to the axis of the rotary portion 10 is an equilateral triangle shown in FIG. 2, in a plane perpendicular to the axis of the hub and centered relative thereto.

The rotary portion 10 of the wind energy system also includes the rotor 16 of the electricity generator 12 of the system whose stator 17 is fixed to the support frame 9 by means of an annular flange 18 perpendicular to the axis of the support frame 9.

The rotor 16 and the stator 17 each comprise two members 16a, 16b and 17a, 17b, respectively, whose active portions take the form of facing disks. The double rotor 16 has two active faces in the form of disks, one of which is on the member 16a and faces the active face of the stator member 17a and the other of which is on the member 16b and faces the active face of the stator member 17b. The stator members 17a and 17b are on respective opposite sides of a support secured to the flange 18 for fixing the stator to the frame 9.

Permanent magnets 19 and 19', which can be made from a material such as neodymium-iron-boron (Nd Fe B), for example, are fixed to the active faces of the members 16a and 16b of the double rotor 16 in successive positions around the circumference of the active faces.

The active faces of the stator members 17a and 17b facing the active faces of the corresponding rotor members 16a and 16b include windings inserted into slots of a stator core consisting of a rolled-up strip of magnetic sheet metal.

Using permanent magnets on the active faces of the rotor produces an electricity generator 12 with a very small pole pitch. This reduces the mass and the overall size of the electricity generator 12 for given installed power.

The magnets 19 and 19' of the members 16a and 16b of the double rotor 16 are thin compared to the overall thickness of the rotor members 16a and 16b themselves, the greater part of the mass of the rotor consisting of a steel strength member on which the permanent magnets are housed and which provides the mechanical strength of the rotor.

The strength members of the rotor members 16a and 16b are interconnected along the generally annular external peripheral portion of the rotor so that the active faces of the rotor members 16a and 16b carrying the permanent magnets 19 and 19' face each other at a distance from each other that is greater than the total thickness of the stator 17. This makes it possible to use the generator structure shown in the figure, in which the stator 17 is between the members 16a and 16b of the rotor 16. This produces a compact electricity generator assembly with a total active surface area corresponding to the sum of the active surface areas of the rotor and stator members.

The front strength member of the rotor member 16a, i.e. the one on the side facing towards the assembly comprising the hub 13 and the blades 14 of the wind energy system, is secured to a generally annular flange 20 by means of which the rotor 16 is fixed to the hub 13 and to the rotary internal portion of the bearing 15.

The bearing 15, which is a rolling bearing, has an outer portion or race coaxial with the support frame 9 and fixed rigidly to the front end portion of the support frame 9 and an inner portion or race that rotates relative to the outer race on the rolling members of the bearing 15.

The hub 13 and the rotor 16 are assembled together, by means of the fixing flange 20 and the rotary inner race of the bearing 15, for example, by tie-rods that provide a strong and rigid assembly with the bearing 15, the rotor 16, and the hub carrying the blades 14 perfectly coaxial.

The bearing 15 is a large rolling bearing whose diameter is substantially equal to or slightly less than the diameter of the circle C, shown in FIG. 2, inscribed in the equilateral triangle constituting the cross section of the prism-shaped surface formed by the plane faces for connecting the blades 14a, 14b and 14c to the hub 13. In all cases, the diameter of the bearing, i.e. the diameter of the circle passing through the centers of the rolling members, is only slightly less than (20% less than or preferably 10% less than) the diameter of the circle C inscribed in the cross section of a surface formed by the blade connecting areas.

Furthermore, as can be seen in FIG. 1, the annular connecting flange 20 of the rotor 16 has an inner portion between the hub 13 and the rotary inner race of the bearing 15 and immediately adjacent the bearing 15 in the axial direction common to the bearing 15, the rotor 16 and the hub 13.

The rotor fixing member 20 is fixed rigidly to the hub 13 and to the bearing 15, for example by tie-rods.

The assembly comprising the sensitive components of the wind energy system inside the nacelle is protected by the nacelle enclosure 7, which has a front portion 7a secured to the rotary portion 10 of the system. A seal is provided between the portion of the nacelle fairing secured to the platform 3a and the fairing portion 7a secured to the rotary portion 10 of the system.

The blades 14 of the wind energy system are mounted on the hub 13 either in a fixed manner, or else so that their pitch can be varied automatically as a function of the wind speed and the rotation speed of the system, and feathered if the rotation speed of the system or the wind speed reaches a critical value. This makes operation of the system totally safe.

Note that using a single large bearing 15 to mount the rotary portion of the wind energy system and a hollow support frame for the stator and the bearing 15 enables an operative 21 on the platform 3a to access the areas in which the blades 14 are connected to the hub 13 from the inside, for example to carry out tests and repairs.

Each of the blades 14 of the wind energy system has an end portion 14' which can be turned automatically about its radial longitudinal axis by a linkage to provide aerodynamic braking of the rotary portion of the system, the ends 14' of the blades 14 of the system pivoting about the longitudinal axis of the blade under the control of the general control system for the wind energy system, as a function of the wind speed or the rotation speed of the rotary portion 10, or centrifugally if the rotary portion is running at an excess speed.

The wind energy system also includes a mechanical brake 22 in the form of a disk brake whose disk is coaxial with the rotor and secured to the member 16b of the rotor 16. The disk brake 22 further includes calipers distributed around the external periphery of the connecting portion 8a of the main frame 8 of the nacelle to interengage with the disk secured to the rotor to brake the rotor and the whole of the rotary portion of the wind energy system or possibly to stop the wind energy system.

The combination of aerodynamic braking and mechanical braking makes operation of the wind energy system safer. Also, integrating the disk brake with the rotor of the electricity generator 12 of the system produces a compact implementation and saves space inside the nacelle.

Furthermore, the nacelle carries an antenna to which there are fixed a weathervane 23 and an anemometer for determining the precise direction and speed of the wind, for the purposes of controlling the wind energy system.

The wind energy system is pointed into the wind by a system for controlling the position of the nacelle as a function of information supplied by the weathervane 23. If an angular difference greater than a specified limit between the position of the system and the direction of the wind as indicated by the weathervane is detected, electric gear motors rotate the nacelle about the vertical axis of the mast 2 until the front of the nacelle faces into the wind. The movement of the nacelle is damped and braked by the hydraulic disk brake 5, 6. The nacelle can turn on its axis up to a particular number of fractions of a turn or a particular number of turns, for example three turns, before an automatic procedure stops it and returns it to its original position, so preventing damage caused by excessive twisting of the cables connecting the nacelle 3 and the mast 2.

When the wind energy system is operating with its front facing into the wind, the action of the wind on the blades 14 causes the rotary portion to rotate. The rotor 16, rotating in front of the stator 17, creates a rotating field that induces electromotive forces in the stator windings. Electricity is recovered and converted by power electronics to supply the electricity to a grid. The electronic control unit of the generator of the system controls the power electronic components to supply the grid with electricity at a constant frequency regardless of the speed of rotation of the rotary portion of the system and optimizes the operation of the generator as a function of wind speed and the speed of the rotary portion 10 of the system.

The rotor 16 of the electricity generator 12 secured to the hub 13 that carries the blades 14 is therefore driven directly in rotation at the speed of the rotary portion, which avoids using a mechanical transmission system such as a multiplier gear.

Variations in the speed of the rotary portion 10 of the wind energy system are compensated by the power electronics for converting the electricity supplied by the generator 12.

The wind exerts not only forces causing the rotary portion of the wind energy system to rotate but also axial forces which must be absorbed to prevent movement and deformation of the components of the rotary portion of the system, especially the rotor 16.

Because of the rigid connection between the hub 13 and the rotary race of the bearing 15, axial forces on the bearing 15 are absorbed directly by the support structure of the nacelle, including the main frame 8 and the support frame 9. There is therefore no axial movement of the component parts of the rotor and the airgap can be maintained perfectly constant.

The airgap between the rotor members and the stator members can be adjusted so that the stator exerts axial magnetic forces on the rotor that at least partly compensate the action of the wind in the axial direction. The bearing 15 is therefore subjected to minimum stresses. Furthermore, the distance between the hub and the bearing 15 along their common axis can be made very small, so that the hub and the blades 14 adjacent the bearing 15 are cantilevered out only very little relative to the bearing 15, which further reduces the stresses on the bearing 15.

Fixing the rotor 16 to the hub 13 and the rotary portion of the bearing immediately adjacent the bearing also limits very significantly deformation of and fatigue stresses on the rotor 16 in service.

In fact, because it is connected to the hub 13 immediately adjacent the bearing 15, the rotor 16 is subjected to a very small (in fact practically negligible) displacement if the wind exerts a bending force on the hub 13 via the blades 14 and about an axis perpendicular to the rotation axis of the rotary portion 10 of the wind energy system. The bearing 15 absorbs the bending forces, which are not transmitted to the rotor 16. This prevents movement of the rotor 16 modifying the airgap and causing deterioration of the rotor through fatigue.

As explained above, one advantage of mounting the rotary portion 10 of the wind energy system on the fixed portion by means of a single large-diameter bearing and of fixing the rotor of the electricity generator adjacent to the bearing is that this allows the forces exerted by the wind on the rotary portion to be transmitted to the fixed portion of the nacelle 3 directly, without passing through the structure of the electric generator, which is thus subjected to lower stresses and can be lighter in weight. Also, the rolling bearing constituting the bearing 15 is constantly loaded, which avoids all risk of premature wear caused by the rolling members being insufficiently loaded.

Furthermore, correct operation of the single rolling bearing constituting the bearing 15 is ensured by an automatic lubrication system guaranteeing the presence of lubricant at all points of the rolling bearing at all times, regardless of the speed of rotation.

The structure of the wind energy system is based on subassemblies which can be connected at junction planes defined by connecting flanges.

A first subassembly comprises the main frame 8 secured to the platform 3a and enclosing the components indicated above, which rotates about a vertical axis on the upper portion of the mast 2, at the level of a first junction plane. The first subassembly is connected by flanges to a second subassembly at the junction plane 11.

The second subassembly, which comprises the support frame 9 and the generator 12 consisting of the stator 17, the rotor 16 and the bearing 15, is connected by flanges to the first subassembly at the junction plane 11 and at the location of the bearing 15 to a third subassembly which comprises, in addition to the hub 13 and the blades 14 of the rotary portion 10, all of the associated components, such as the aerodynamic brake accessories. The forces exerted by the wind on the third subassembly are absorbed by the first subassembly via the second subassembly.

The first subassembly also encloses components such as the converter, the control unit for the wind energy system, and lubrication and cooling systems.

The rotary portion 10 of the wind energy system is connected to the end of the support frame 9 by the bearing 15 whose inner and outer races are respectively attached to the rotary portion and to the support frame 9.

All forces exerted on the rotary portion at the location of the bearing 15 are absorbed by the portion of the nacelle secured to the platform.

The invention is not strictly limited to the embodiment described.

Thus the electric generator can include a single rotor member and a single stator member or any number of rotor members and stator members, with the rotor members fixed to the hub of the rotary portion of the wind energy system by a fixing member at a location adjacent a single bearing in which the rotary portion rotates.

The wind energy system in accordance with the invention can include any control, adjustment or safety systems that may be necessary for failsafe operation of the system.

What is claimed is:

1. A system for producing electricity from wind energy, the system comprising a vertical mast having a bottom end portion fixed to a support surface, a nacelle mounted to turn about a vertical axis on atop end portion of the mast, a rotary portion comprising a hub and two or more substantially radial blades fixed to the hub, a bearing in which the rotary portion rotates and which has a substantially horizontal axis, and an electricity generator comprising a stator secured to the nacelle and a rotor secured to the hub of the rotary portion by a fixing member substantially perpendicular to the rotation axis of the rotary portion, wherein:
   both the rotor and the stator have respective active portions each in the form of a disk carrying facing electromagnetic members,
   the rotary portion rotates on the nacelle in a single bearing whose diameter is 80%–100% the diameter of a circle inscribed in the cross section perpendicular to the axis of the rotary portion of a surface formed by areas in which the blades are connected to the hub, and
   the fixing member fixing the rotor to the hub is adjacent the bearing along the axial direction of the bearing.

2. A system according to claim 1, wherein the fixing member connecting the rotor to the hub is annular and has an inner portion connecting it to the hub and to a rotary inner race of the rolling bearing between the hub and the bearing in the axial direction of the hub and the bearing, to both of which the fixing member is rigidly fixed.

3. A system according to claim 1, comprising a first subassembly comprising a main frame rotatably mounted on the top portion of the mast, a second subassembly fixed to the first subassembly at a junction plane and comprising, on a support frame, the electricity generator including the stator, the rotor, and the bearing, and a third subassembly connected to the second subassembly at the location of the bearing and comprising the hub and the blades of the rotary portion, the three subassemblies being interconnected by flanges to absorb forces exerted by the wind on the rotary portion on the first subassembly via the second subassembly, the first subassembly enclosing a plurality of preselected system components.

4. A system according to claim 1, wherein the active portions in the form of disks of the rotor and the stator are separated by an airgap whose width is adjusted so that the stator exerts on the rotor and on the rotary portion an axial force in the opposite direction to the axial force exerted by the wind on the rotary portion.

5. A system according to claim 1, further comprising a mechanical brake for the rotary portion including a disk brake whose disk is secured to the rotor of the electricity generator and which includes a plurality of calipers for braking the disk distributed around the outside periphery of a portion of a frame of the nacelle.

6. A system according to claim 5, further comprising an aerodynamic braking system including radial end portions of the blades opposite the ends of the blades connected to the hub, adapted to rotate about a longitudinal axis of the corresponding radial blade and connected to a system for pivoting the end portion of the blade as a function of the wind speed or the speed of rotation of the rotary portion.

7. A system according to claim 1, wherein the bearing is a rolling bearing and the nacelle includes a system for lubricating the rolling bearing.

8. A system according to claim 1, wherein the bearing is adjacent the hub in the axial direction so that the rotary portion of the system is fixed to the frame of the nacelle with a cantilever that is small.

9. A system according to claim 1, wherein an active portion of the rotor in the form of a disk carries permanent magnets distributed in the circumferential direction of the active portion of the rotor.

* * * * *